US012617998B1

(12) United States Patent
Alanqari et al.

(10) Patent No.: US 12,617,998 B1
(45) Date of Patent: May 5, 2026

(54) WELL CEMENTING WITH A COMPOSITION INCLUDING RED MUD

(71) Applicant: Saudi Arabian Oil Company, Dhahran (SA)

(72) Inventors: Khawlah Alanqari, Al Khobar (SA); Abdullah Saleh Hussain Al-Yami, Dhahran (SA); Abdulaziz Alhelal, Al Ahsa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 19/010,845

(22) Filed: Jan. 6, 2025

(51) Int. Cl.
| | |
|---|---|
| *C09K 8/44* | (2006.01) |
| *C08G 59/24* | (2006.01) |
| *C08G 59/50* | (2006.01) |
| *C08K 11/00* | (2006.01) |
| *E21B 33/14* | (2006.01) |

(52) U.S. Cl.
CPC .............. *C09K 8/44* (2013.01); *C08G 59/245* (2013.01); *C08G 59/502* (2013.01); *C08K 11/005* (2013.01); *E21B 33/14* (2013.01)

(58) Field of Classification Search
CPC ...... C09K 8/44; C08G 59/245; C08G 59/502; C08K 11/005; E21B 33/14
See application file for complete search history.

(56) References Cited

U.S. PATENT DOCUMENTS

| | | | |
|---|---|---|---|
| 3,625,287 | A | 12/1971 | Young |
| 4,547,298 | A | 10/1985 | Novak |
| 5,911,282 | A | 6/1999 | Onan et al. |
| 6,448,206 | B1 | 9/2002 | Griffith et al. |
| 7,794,537 | B2 | 9/2010 | Barlet-Gouedard et al. |
| 7,846,250 | B2 | 12/2010 | Barlet-Gouedard et al. |
| 8,157,009 | B2 | 4/2012 | Patil et al. |
| 9,222,010 | B2 | 12/2015 | Porcherie et al. |
| 9,321,687 | B2 | 4/2016 | Gupta et al. |
| 9,394,202 | B2 | 7/2016 | Porcherie et al. |
| 9,410,066 | B2 | 8/2016 | Ghassemzadeh |
| 9,701,885 | B2 | 7/2017 | Husein et al. |
| 9,828,293 | B2 | 11/2017 | Yadav et al. |
| 9,890,082 | B2 | 2/2018 | Dubey |

(Continued)

FOREIGN PATENT DOCUMENTS

| | | | |
|---|---|---|---|
| WO | WO 2016043979 A1 | 3/2016 | |
| WO | WO 2021188154 A1 | 9/2021 | |
| WO | WO-2024092303 A1 * | 5/2024 | ............. C04B 26/10 |

OTHER PUBLICATIONS

Kumar, Ashok, Gurpreet Singh, and Niraj Bala. "Evaluation of flexural strength of epoxy polymer concrete with red mud and fly ash." International Journal of Current Engineering and Technology 3.5 (2013): 1799-1803. (Year: 2013).*

(Continued)

*Primary Examiner* — Crystal J Lee
(74) *Attorney, Agent, or Firm* — Fish & Richardson P.C.

(57) ABSTRACT

A cementing composition is flowed into an annulus between a tubular disposed within a wellbore formed in a subterranean formation and a wall of the wellbore. The cementing composition includes red mud, an epoxy resin, and a curing agent. The curing agent includes nitrogen. The curing agent crosslinks the epoxy resin to solidify the cementing composition, thereby cementing the tubular within the wellbore.

19 Claims, 3 Drawing Sheets

(56)                    References Cited

U.S. PATENT DOCUMENTS

| | | | |
|---|---|---|---|
| 10,005,930 B2 | 6/2018 | Reddy | |
| 10,017,418 B2 | 7/2018 | Thomas et al. | |
| 10,081,755 B2 | 9/2018 | Ballard | |
| 10,112,869 B2 | 10/2018 | Agapiou | |
| 10,113,389 B2 | 10/2018 | Pandey et al. | |
| 10,138,405 B2 | 11/2018 | Kulkarni et al. | |
| 10,144,858 B2 | 12/2018 | Kennedy et al. | |
| 10,920,121 B1 | 2/2021 | Alanqari et al. | |
| 11,066,899 B1 | 7/2021 | Alanqari | |
| 11,472,741 B2 | 10/2022 | Sampson | |
| 2006/0041060 A1 | 2/2006 | George | |
| 2007/0125272 A1 | 6/2007 | Johnson | |
| 2009/0200029 A1 | 8/2009 | Roddy et al. | |
| 2017/0002257 A1 | 1/2017 | Pisklak | |
| 2018/0215988 A1* | 8/2018 | Gamwell | C04B 28/02 |
| 2020/0131425 A1 | 4/2020 | Alsaihati | |

OTHER PUBLICATIONS

U.S. Appl. No. 18/480,888, filed Oct. 4, 2023, Al Safran et al.
U.S. Appl. No. 19/010,674, filed Jan. 6, 2025, Alanqari et al.

[No Author Listed], "Standard Test Method for Epoxy Content of Epoxy Resins," ASTM-D1652-11, 2019, 2 pages.
Alanqari et al., "Synthesis of Epoxy Resin Based Geopolymer Utilizing Saudi Arabian Volcanic Ash for Primary Well Cementing Applications," Prepared for Presentation at the ADIPEC held in Abu Dhabi, UAE, Oct. 31-Nov. 3, 2022, 7 pages.
Al-Yami et al., "Chemical Additives for Oil Well Cementing," Research & Reviews: Journal of Chemistry, Oct. 20, 2017, 6(4):1-14, 14 pages.
Kumar et al., "Evaluation of Flexural Strength of Epoxy Polymer Concrete with Red Mud and Fly Ash," International Journal of Current Engineering and Technology, Dec. 2013, 3(5):1799-1803, 5 pages.
Maherzi et al., "Study of the polymer mortar based on dredged sediments and epoxy resin: Effect of the sediments on the behavior of the polymer mortar," Powder Technology, 2020, 361;968-982, 15 pages.
Red Mud Production, Composition and Impact, Richard (ed.), 2018, 327 pages.
Yang et al., "Recent advances of thermosetting resin and its application prospect in oil and gas drilling and production engineering," Geoenergy Science and Engineering, 2023, 230(212222):1-29, 29 pages.

* cited by examiner (i)

(ii)

(iii)

WELL CEMENTING WITH A COMPOSITION INCLUDING RED MUD

TECHNICAL FIELD

This disclosure relates to cementing fluids, and in particular, cementing fluids for well cementing.

BACKGROUND

Natural resources such as gas, oil, and water in a subterranean formation can be produced by drilling a wellbore into the subterranean formation while circulating a drilling fluid in the wellbore. A well is cemented prior to hydrocarbon production. Well cementing includes introducing cement to provide a hydraulic seal that establishes zone isolation, prevents fluid communication between producing zones in the borehole, and blocks the escape of fluids to the surface. Well cementing also anchors and supports tubulars installed in the wellbore and protects the tubulars against corrosion by formation fluids.

SUMMARY

This disclosure describes technologies relating to cementing wells formed in subterranean formations. The subject matter described in this disclosure can be implemented in particular implementations, so as to realize one or more of the following advantages. The compositions, methods, and systems described can be used to cement a well formed in a subterranean formation. Red mud, which is typically considered a waste material, can be incorporated into the compositions described to improve viscosity of the cementing fluids. Thus, the compositions, methods, and systems described can support sustainability of oil and gas operations by reusing and incorporating waste materials, such as red mud, in performing useful operations, such as cementing wells.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes cementing a well using a composition including an epoxy resin, a crosslinker (also referred to as a curing agent), and red mud (which is typically a waste material and also referred to as bauxite residue). The red mud facilitates generation of a hard gel that becomes rigid downhole for creating a seal in well cementing applications. In some cases, the composition includes an emulsifier for improved mixing. Weighting materials can also be included in the composition. The crosslinker increases viscosity of the composition. Setting time of the composition to form the seal can be controlled by varying the type of resin and/or the type of crosslinker. Setting time of the composition to form the seal can be controlled by varying the concentration of crosslinker in the composition. Red mud is a highly basic material which can raise environmental concerns if not disposed of properly. By re-using red mud that is generated as an industrial by-product to generate a value-added product for cementing wells, wells can be constructed more sustainably.

Red mud (also referred to as bauxite residue) is an industrial waste by-product that can be produced during the production of alumina, for example, via the Bayer process. Typically, about one to two tons of red mud are produced for every ton of aluminum produced. Over 175 million tons of red mud are produced globally. Red mud is highly basic, with a pH ranging from about 10 to about 12, which can introduce environment concerns if not disposed of properly. Red mud is composed of a mixture of solid and metallic oxides (mainly aluminum oxide ($Al_2O_3$) and silicon dioxide ($SiO_2$)) and can be added to the cementing fluid to increase viscosity and serve as a weighting material.

Extracting hydrocarbons from subterranean sources may require drilling a hole from the surface to the subterranean geological formation housing the hydrocarbons. Specialized drilling techniques and materials are utilized to form the bore hole and extract the hydrocarbons. Specialized materials utilized in drilling operations include materials for sealing the casing-casing annulus of the wellbore, which may be formulated for specific downhole conditions. A wellbore is a hole that extends from the surface to a location below the surface to permit access to hydrocarbon-bearing subterranean formations. The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. The fluid conduit may be defined by one or more tubular strings, such as casings for example, inserted into the wellbore and secured in the wellbore.

Figure 1:
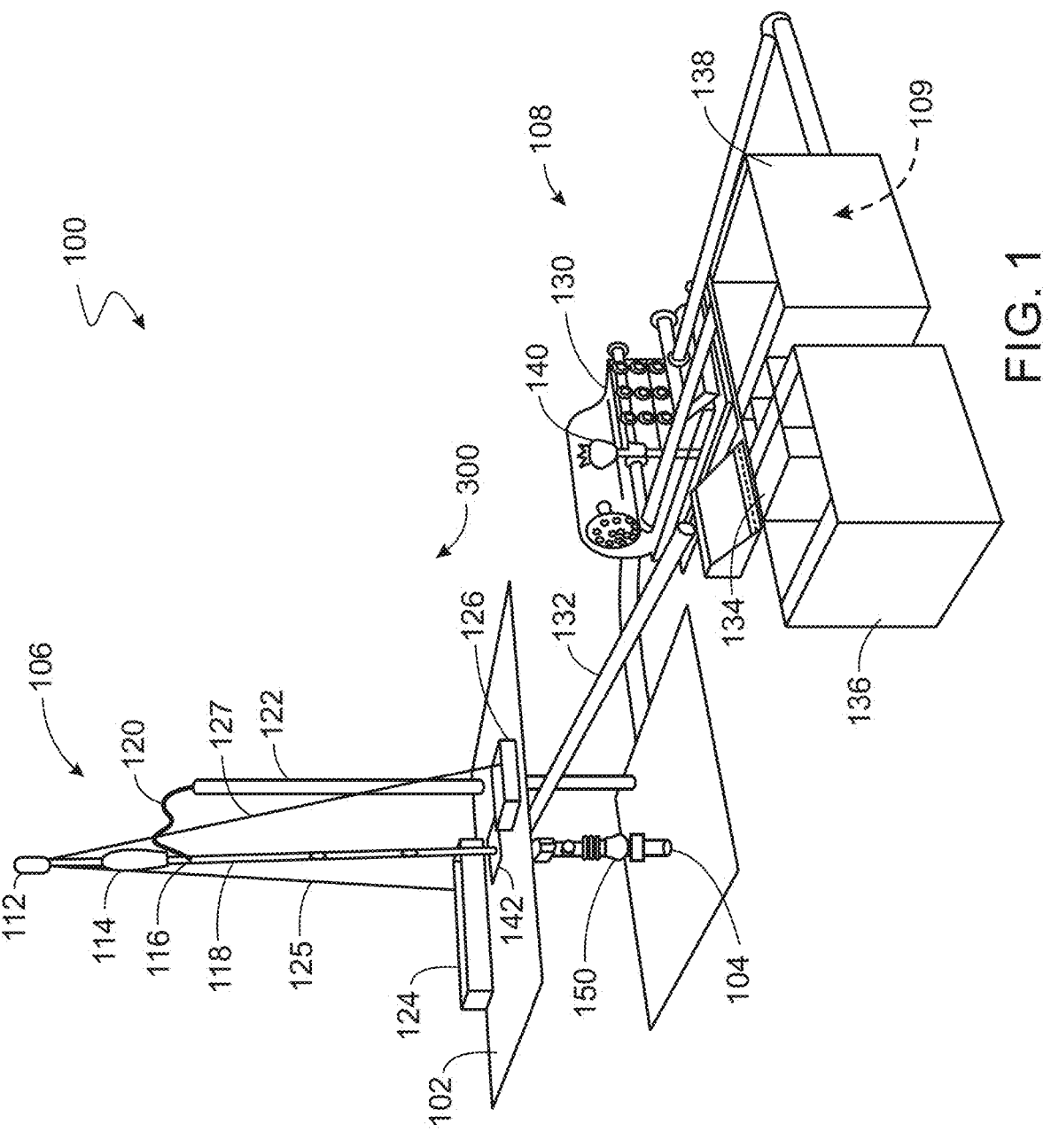
FIG. 1 is a schematic diagram of an example rig system for drilling a wellbore in a subterranean formation.

FIG. 1 is a partial schematic perspective view of an example rig system 100 for drilling and producing a well. The well can extend from the surface through the Earth to one or more subterranean zones of interest. The example rig system 100 includes a drill floor 102 positioned above the surface, a wellhead 104, a drill string assembly 106 supported by the rig structure, and a fluid circulation system 108 to filter used drilling fluid from the wellbore and provide clean drilling fluid to the drill string assembly 106. For example, the example rig system 100 of FIG. 1 is shown as a drill rig capable of performing a drilling operation with the rig system 100 supporting the drill string assembly 106 over a wellbore. The wellhead 104 can be used to support casing or other well components or equipment into the wellbore of the well. The example wellhead assembly 104 can take a variety of forms and include a number of different components. For example, the wellhead assembly 104 can include additional or different components than the example shown in FIG. 1. Similarly, the circulation system 108 can include additional or different components than the example shown in FIG. 1.

The derrick or mast is a support framework mounted on the drill floor 102 and positioned over the wellbore to support the components of the drill string assembly 106 during drilling operations. A crown block 112 forms a longitudinally-fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, and the kelly 118 turns with the drill string assembly 106 as the rotary table 142 of the drill string assembly turns.

Figure 2:
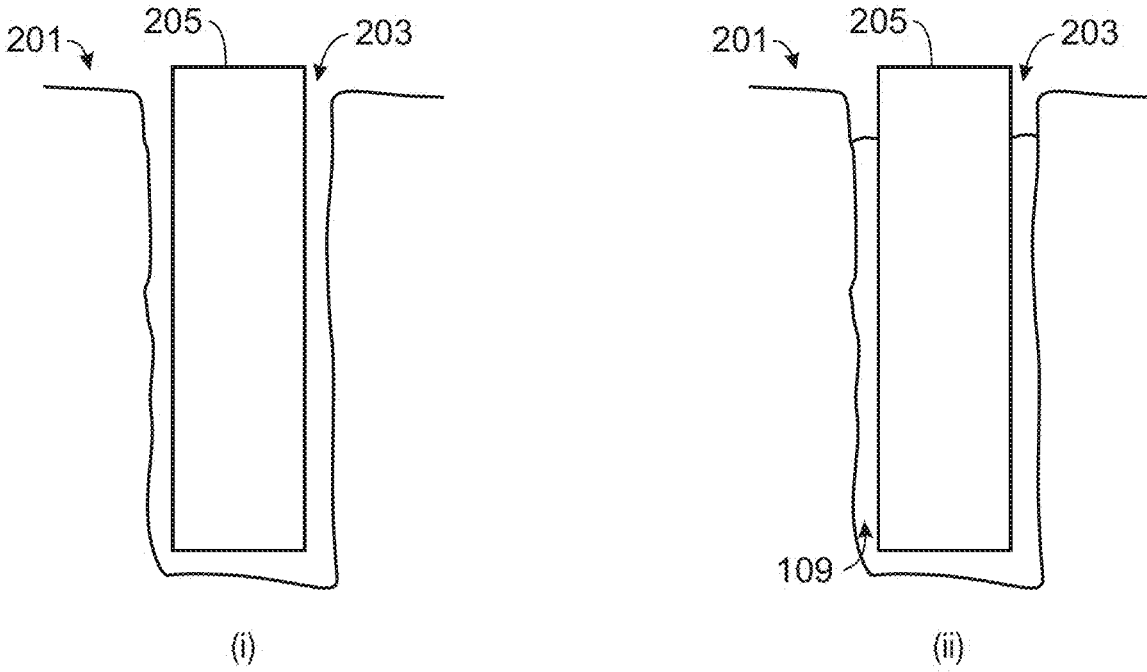
FIG. 2 is a progression of schematics depicting example stages of cementing a well.
Figure 2:
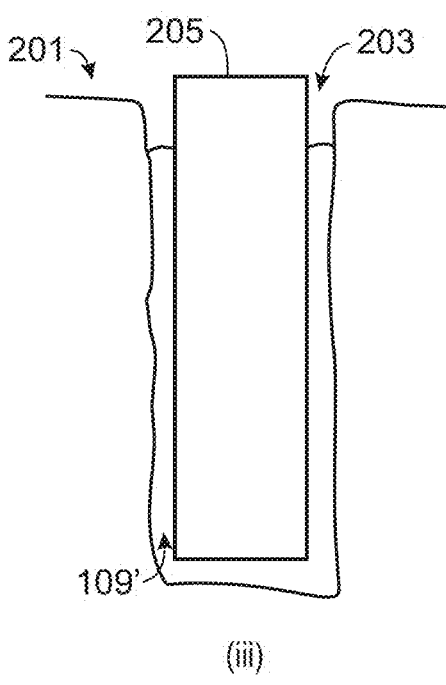

In the example rig system 100 of FIG. 1, the drill string assembly 106 is made up of drill pipes with a drill bit (not shown) at a longitudinally bottom end of the drill string. The drill string assembly 106 is described in more detail later, and a more detailed view is shown in FIG. 2. The drill pipe can include hollow steel piping, and the drill bit can include cutting tools, such as blades, dies, rollers, cutters, or a combination of these, to cut into the formation and form the wellbore. The drill bit rotates and penetrates through rock formations below the surface under the combined effect of axial load and rotation of the drill string assembly 106. In some implementations, the kelly 118 and swivel 116 can be replaced by a top drive that allows the drill string assembly 106 to spin and drill. The wellhead assembly 104 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The wellhead assembly 104 also includes a blow-out preventer 150 positioned at the surface 101 of the well and below (but often connected to) the drill floor 102. The blowout preventer 150 acts to prevent well blowouts caused by formation fluid entering the wellbore, displacing drilling fluid, and flowing to the surface at a pressure greater than atmospheric pressure. The blowout preventer 150 can close around (and in some instances, through) the drill string assembly 106 and seal off the space between the drill string and the wellbore wall. The blowout preventer 150 is a valve (or assembly of valves) at the top of the well that can be closed to seal the well to prevent a blowout, which is an uncontrolled release of formation fluid from the well.

During a drilling operation of the well, the circulation system 108 circulates drilling fluid from the wellbore to the drill string assembly 106, filters used drilling fluid from the wellbore, and provides clean drilling fluid to the drill string assembly 106. The example circulation system 108 includes a fluid pump 130 that fluidly connects to and provides drilling fluid to drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling fluid from the surface, through the drill string assembly 106, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluid to go into the formation. Apart from well control, drilling fluid can also cool the drill bit and lift rock cuttings from the drilled formation up the annulus and to the surface to be filtered out and treated before it is pumped down the drill string assembly 106 again. The drilling fluid returns in the annulus with rock cuttings and flows out to the flow-out line 132, which connects to and provides the fluid to the shale shaker 134. The flow line is an inclined pipe that directs the drilling fluid from the annulus to the shale shaker 134. The shale shaker 134 includes a mesh-like surface to separate the coarse rock cuttings from the drilling fluid, and finer rock cuttings and drilling fluid then go through the settling pit 136 to the suction pit 136. The circulation system 108 includes a mud hopper 140 into which materials (for example, to provide dispersion, rapid hydration, and uniform mixing) can be introduced to the circulation system 108. The fluid pump 130 cycles the drilling fluid up the standpipe 122 through the swivel 116 and back into the drill string assembly 106 to go back into the well.

Once the well has been drilled and tubulars are installed within the well, the rig system 100 can be used to cement the well. The circulation system 108 or another similar system can be used to flow a cementing fluid 109 into the well. The circulation system 108 or another similar system can be used to flow a displacement fluid into the well, which displaces the cementing fluid 109 to at least partially fill an annulus defined between the tubulars and the wellbore. The cementing fluid 109 is allowed to set (harden) to complete the well cementing process.

The cementing fluid 109 includes red mud, an epoxy resin, and a curing agent. In some implementations, the cementing fluid 109 includes an emulsifier. Red mud can increase the viscosity of the cementing fluid 109 and can also function as a weighting material. In some implementations, the cementing fluid 109 includes about 0.01 weight percent (wt. %) to about 75 wt. %, about 0.05 wt. % to about 60 wt. %, about 0.1 wt. % to about 50 wt. %, about 1.0 wt. % to about 40 wt. %, about 2.0 wt. % to about 30 wt. %, about 3.0 wt. % to about 20 wt. %, about 4.0 wt. % to about 10 wt. %, or about 5.0 wt. % to about 8.0 wt. % red mud. In some implementations, the cementing fluid 109 includes about 0.01 wt. % to about 75 wt. % red mud. In some implementations, the cementing fluid 109 includes about 0.05 wt. % to about 60 wt. % red mud. In some implementations, the cementing fluid 109 includes about 0.1 wt. % to about 50 wt. % red mud. In some implementations, the cementing fluid 109 includes about 1.0 wt. % to about 40 wt. % red mud. In some implementations, the cementing fluid 109 includes about 2.0 wt. % to about 30 wt. % red mud. In some implementations, the cementing fluid 109 includes about 3.0 wt. % to about 20 wt. % red mud. In some implementations, the cementing fluid 109 includes about 4.0 wt. % to about 10 wt. % red mud. In some implementations, the cementing fluid 109 includes about 5.0 wt. % to about 8.0 wt. % red mud.

In some implementations, the cementing fluid 109 includes about 0.01 wt. % to about 50 wt. %, about 0.01 wt. % to about 25 wt. %, about 0.01 wt. % to about 15 wt. %, about 0.01 wt. % to about 10 wt. %, or about 0.01 wt. % to about 5 wt. % red mud. In some implementations, the cementing fluid 109 includes about 0.01 wt. % to about 50 wt. % red mud. In some implementations, the cementing fluid 109 includes about 0.01 wt. % to about 25 wt. % red mud. In some implementations, the cementing fluid 109 includes about 0.01 wt. % to about 15 wt. % red mud. In some implementations, the cementing fluid 109 includes about 0.01 wt. % to about 10 wt. % red mud. In some implementations, the cementing fluid 109 includes about 0.01 wt. % to about 5 wt. % red mud.

In some implementations, the cementing fluid 109 includes about 0.1 wt. % to about 25 wt. %, about 1 wt. % to about 20 wt. %, about 5 wt. % to about 15 wt. %, or about 6 wt. % to about 14 wt. % red mud. In some implementations, the cementing fluid 109 includes about 0.1 wt. % to about 25 wt. % red mud. In some implementations, the cementing fluid 109 includes about 1 wt. % to about 20 wt. % red mud. In some implementations, the cementing fluid 109 includes about 5 wt. % to about 15 wt. % red mud. In some implementations, the cementing fluid 109 includes about 6 wt. % to about 14 wt. % red mud.

In some implementations, the cementing fluid 109 includes about 6 wt. % to about 20 wt. %, about 6.5 wt. % to about 18 wt. %, about 7 wt. % to about 16 wt. %, about 7.5 wt. % to about 15 wt. %, or about 8 wt. % to about 14 wt. % red mud. In some implementations, the cementing fluid 109 includes about 6 wt. % to about 20 wt. % red mud. In some implementations, the cementing fluid 109 includes about 6.5 wt. % to about 18 wt. % red mud. In some implementations, the cementing fluid 109 includes about 7 wt. % to about 16 wt. % red mud. In some implementations, the cementing fluid 109 includes about 7.5 wt. % to about 15 wt. % red mud. In some implementations, the cementing fluid 109 includes about 8 wt. % to about 14 wt. % red mud.

In some implementations, about 50% of the red mud particles have a diameter of about 50 micrometers (μm) or less. In some implementations, about 60% of the red mud particles have a diameter of about 50 μm or less. In some implementations, about 70% of the red mud particles have a diameter of about 50 μm or less. In some implementations, about 80% of the red mud particles have a diameter of about 50 μm or less. In some implementations, about 90% of the red mud particles have a diameter of about 50 μm or less.

In some implementations, the red mud particles are about 10 μm to about 100 μm, about 20 μm to about 90 μm, about 30 μm to about 80 μm, about 40 μm to about 70 μm, or about 50 μm to about 60 μm in diameter. In some implementations, the red mud particles are about 10 μm to about 100 μm in diameter. In some implementations, the red mud particles are about 20 μm to about 90 μm in diameter. In some implementations, the red mud particles are about 30 μm to about 80 μm in diameter. In some implementations, the red mud particles are about 40 μm to about 70 μm in diameter. In some implementations, the red mud particles are about 50 μm to about 60 μm in diameter.

In some implementations, the red mud particles are about 10 μm in diameter. In some implementations, the red mud particles about 20 μm in diameter. In some implementations, the red mud particle size is about 30 μm in diameter. In some implementations, the red mud particle size is about 40 μm in diameter. In some implementations, the red mud particle size is about 50 μm in diameter. In some implementations, the red mud particle size is about 60 μm in diameter. In some implementations, the red mud particle size is about 70 μm in diameter. In some implementations, the red mud particle size is about 80 μm in diameter. In some implementations, the red mud particle size is about 90 μm. In some implementations, the red mud particle size is about 100 μm in diameter.

In some implementations, about 80% of the red mud particles have a diameter of about 10 μm or less. In some implementations, about 80% of the red mud particles have a diameter of about 20 μm or less. In some implementations, about 80% of the red mud particles have a diameter of about 30 μm or less. In some implementations, about 80% of the red mud particles have a diameter of about 40 μm or less. In some implementations, about 80% of the red mud particles have a diameter of about 50 μm or less. In some implementations, about 80% of the red mud particles have a diameter of about 60 μm or less. In some implementations, about 80% of the red mud particles have a diameter of about 70 μm or less. In some implementations, about 80% of the red mud particles have a diameter of about 80 μm or less. In some implementations, about 80% of the red mud particles have a diameter of about 90 μm or less. In some implementations, about 80% of the red mud particles have a diameter of about 100 μm or less.

In some implementations, the red mud includes a plurality of oxides. In some implementations, the red mud includes calcium oxide (CaO), silicon dioxide ($SiO_2$), aluminum oxide ($Al_2O_3$), iron III oxide ($Fe_2O_3$), magnesium oxide (MgO), potassium oxide ($K_2O$), and combinations thereof. In some implementations, the red mud includes a plurality of oxides. In some implementations, the red mud includes calcium oxide (CaO), silicon dioxide ($SiO_2$), aluminum oxide ($Al_2O_3$), iron III oxide ($Fe_2O_3$), magnesium oxide (MgO), and potassium oxide ($K_2O$). In some implementations, the red mud includes calcium oxide (CaO). In some implementations, the red mud includes silicon dioxide ($SiO_2$). In some implementations, the red mud includes aluminum oxide ($Al_2O_3$). In some implementations, the red mud includes iron III oxide ($Fe_2O_3$). In some implementations, the red mud includes magnesium oxide (MgO). In some implementations, the red mud includes potassium oxide ($K_2O$).

In some implementations, the red mud includes oxygen (O), sodium (Na), iron (Fc), aluminum (Al), silicon (Si), calcium (Ca), titanium (Ti), sulfur(S), fluorine (F), chlorine (Cl), strontium (Sr), zirconium (Zr), phosphorus (P), magnesium (Mg), chromium (Cr), and combinations thereof. In some implementations, the red mud includes oxygen (O), sodium (Na), titanium (Ti), sulfur(S), fluorine (F), chlorine (Cl), strontium (Sr), zirconium (Zr), phosphorus (P), magnesium (Mg), and chromium (Cr). In some implementations, the red mud includes oxygen (O). In some implementations, the red mud includes sodium (Na). In some implementations, the red mud includes iron (Fe). In some implementations, the red mud includes aluminum (Al). In some implementations, the red mud includes silicon (Si). In some implementations, the red mud includes calcium (Ca). In some implementations, the red mud includes titanium (Ti). In some implementations, the red mud includes sulfur(S). In some implementations, the red mud includes fluorine (F). In some implementations, the red mud includes chlorine (CI). In some implementations, the red mud includes strontium (Sr). In some implementations, the red mud includes zirconium (Zr). In some implementations, the red mud includes phosphorus (P). In some implementations, the red mud includes magnesium (Mg). In some implementations, the red mud includes chromium (Cr).

The cementing fluid 109 can include a single type of epoxy resin or multiple types of epoxy resins mixed together. The type(s) of epoxy resin and the concentration of the epoxy resin(s) in the cementing fluid 109 may affect the viscosity of the cementing fluid 109 before setting. The epoxy resin(s) may have a viscosity that enables the cementing fluid 109 to be transferred into an annulus between the exterior surface of the tubular string and the wellbore wall or the interior surface of a casing surrounding the tubular string. In some implementations, the epoxy resin(s) has/have a viscosity that enables introduction of the cementing fluid 109 having the epoxy resin(s) into a wellbore. In some implementations, the cementing fluid 109 includes about 20 wt. % to about 99 wt. %, about 30 wt. % to about 99 wt. %, about 50 wt. % to about 95 wt. %, about 70 wt. % to about 92 wt. %, or about 80 wt. % to about 90 wt. % epoxy resin(s). In some implementations, the cementing fluid 109 includes about 30 wt. % to about 99 wt. % epoxy resin(s). In some implementations, the cementing fluid 109 includes about 50 wt. % to about 95 wt. % epoxy resin(s). In some implementations, the cementing fluid 109 includes about 70 wt. % to about 92 wt. % epoxy resin(s). In some implementations, the cementing fluid 109 includes about 80 wt. % to about 90 wt. % epoxy resin(s).

The curing agent is an amine-type curing agent that includes nitrogen. Curing time of the cementing fluid 109 to form solidified cement can be controlled, for example, by adjusting the type of curing agent, adjusting the concentration of the curing agent in the cementing fluid 109, or both. In some implementations, the cementing fluid 109 includes a weighting material, such as barite or manganese tetraoxide ($Mn_3O_4$).

In some implementations, the cementing fluid 109 includes from 50 weight percent (wt. %) to 97 wt. % epoxy resin. The epoxy resin can include at least one of 2,3-epoxypropyl o-tolyl ether, alkyl glycidyl ethers having from 12 to 14 carbon atoms, bisphenol-A-epichlorohydrin epoxy resin, or a compound having formula (I):

$$(OC_2H_3)-CH_2-O-R^1-O-CH_2-(C_2H_3O) \qquad (I)$$

where $R^1$ is a linear or branched hydrocarbyl having from 4 to 24 carbon atoms, such as from 4 to 20, from 4 to 16, from 4 to 12, from 4 to 8, from 6 to 24, from 6 to 20, from 6 to 16, or from 6 to 12 carbon atoms. The epoxy resin can include bisphenol-A-based epoxy resins, bisphenol-F-based epoxy resins, aliphatic epoxy resins, Novalac resins, or combinations of these epoxy resins. Aliphatic epoxy resins may, for example, have the chemical formula (I). In some implementations, $R^1$ is an alkyl group. For example, the epoxy resin can include 1,6-hexanediol diglycidyl ether, which has formula (II):

$$(OC_2H_3)-CH_2-O-C_6H_{12}-O-CH_2-(C_2H_3O) \qquad (II)$$

In some implementations, the epoxy resin includes at least one of 1,6-hexanediol diclycidyl ether, alkyl glycidyl ethers having from 12 to 14 carbon atoms, 2,3-epoxypropyl o-tolyl ether, or bisphenol-A-epichlorohydrin epoxy resin. In some implementations, the epoxy resin includes at least one of 1,6-hexanediol diclycidyl ether, alkyl glycidyl ethers having from 12 to 14 carbon atoms, or 2,3-epoxypropyl o-tolyl ether.

In some implementations, the epoxy resin has an epoxy value of from about 4.5 epoxy equivalents per kilogram of the epoxy resin to about 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. In some implementations, the epoxy resin has an epoxy equivalent weight of from about 170 to about 350 grams of resin per epoxy equivalent (g/eq). The epoxy value and epoxy equivalent weight of an epoxy resin can, for example, be determined according to standard testing methods, such as ASTM-D1652.

In some implementations, the epoxy resin of the cementing fluid 109 is modified with a reactive diluent. The type and amount of reactive diluent may influence the viscosity, flexibility, hardness, chemical resistance, mechanical properties, plasticizing effect, reactivity, crosslinking density, or other properties of the epoxy resin. In some implementations, the reactive diluent is added to the epoxy resin to change the viscosity of the epoxy resin, such as to reduce the viscosity of the epoxy resin. In some implementations, the reactive diluent is added to improve at least one of the adhesion, the flexibility, or the solvent resistance of the epoxy resin. The reactive diluent can include a non-functional, mono-functional, di-functional, or multi-functional reactive diluent. For example, a non-functional reactive diluent does not have an epoxide functional group. As used in relation to reactive diluents, the term "functional" refers to the reactive diluent having at least one epoxide functional group. Therefore, a functional reactive diluent may have one, two, three, or more than three epoxide functional groups. The term "non-functional", as used in relation to reactive diluents, refers to a reactive diluent that does not have at least one epoxide functional group. Thus, a non-functional reactive diluent does not have at least one epoxide functional group, but still participates in at least one chemical reaction during reaction of the epoxide resin. The term "non-reactive diluent" refers to a diluent that does not participate in a chemical reaction during reaction of the epoxy resin. Examples of reactive and non-reactive diluents include, but are not limited to, propylene glycol diglycidyl ether, butanediol diglycidyl ether, cardanol glycidyl ether derivatives, propanetriol triglycidyl ether, aliphatic monoglycidyl ethers of C13-C15 alcohols, or combinations of functional or non-functional reactive diluents and non-reactive diluents. In some implementations, the epoxy resin includes a reactive diluent having the formula (III):

$$R_2-O-CH_2-(C_2H_3O) \qquad (III)$$

where $R^2$ is a hydrocarbyl having from 12 to 14 carbon atoms. $R^2$ can be linear, branched, or cyclic. In some implementations, $R_2$ can be an alkyl group.

In some implementations, the epoxy resin includes an amount of reactive diluent that reduces the viscosity of the epoxy resin. In some implementations, the epoxy resin includes an amount of reactive diluent that modifies one or more of the adhesion, the flexibility, or the solvent resistance of the epoxy resin. In some implementations, the epoxy resin includes from 1 wt. % to 30 wt. % of the reactive diluent based on the total weight of the epoxy resin portion of the cementing fluid 109. As used in this disclosure, the term "epoxy resin portion" refers to the constituents of the epoxy resin system that do not include the curing agent, weighting agents (such as barite or volcanic ash), or other additives, such as accelerators or retarders. The epoxy resin portion includes the epoxy resins and any added reactive or non-reactive diluent. In some implementations, the epoxy resin includes from about 1 wt. % to about 20 wt. %, from about 1 wt. % to about 16 wt. %, from about 1 wt. % to about 14 wt. %, from about 1 wt. % to about 12 wt. %, from about 5 wt. % to about 30 wt. %, from about 5 wt. % to about 20 wt. %, from about 5 wt. % to about 16 wt. %, from about 5 wt. % to about 14 wt. %, from about 5 wt. % to about 12 wt. %, from about 10 wt. % to about 30 wt. %, from about 10 wt. % to about 20 wt. %, from about 10 wt. % to about 16 wt. %, from about 10 wt. % to about 14 wt. %, from about 12 wt. % to about 30 wt. %, from about 12 wt. % to about 20 wt. %, from about 12 wt. % to about 16 wt. %, from about 14 wt. % to about 30 wt. %, from about 14 wt. % to about 20 wt. %, or from about 14 wt. % to about 16 wt. % of the reactive diluent based on the total weight of the epoxy resin portion of the cementing fluid 109.

In some implementations, the epoxy resin includes bisphenol-A-(epichlorohydrin) epoxy resin with oxirane mono [(C12-C14)-alkyloxy) methyl] derivatives. Bisphenol-A-epichlorohydrin epoxy resin is an epoxy resin made by reaction of bisphenol-A and epichlorohydrin. The bisphenol-A-(epichlorohydrin) epoxy resin may then be modified with the reactive diluent oxirane mono [(C12-C14)-alkyloxy) methyl] derivatives to reduce the viscosity of the resin and improve the adhesion, flexibility, and solvent resistance of the final epoxy resin.

The bisphenol-A-(epichlorohydrin) epoxy resin with the reactive diluent oxirane mono [(C12-C14)-alkyloxy) methyl] derivatives may modify the viscosity of the cementing fluid 109, or may provide the cementing fluid 109 with a non-crystallizing resin and improved mechanical and chemical resistance compared to compositions without the bisphenol-A-(epichlorohydrin) epoxy resin with the reactive diluent oxirane mono [(C12-C14)-alkyloxy) methyl] derivatives. In some implementations, the epoxy resin includes from about 80 wt. % to about 90 wt. %, from about 80 wt. % to about 88 wt. %, from about 80 wt. % to about 86 wt. %, from about 80 wt. % to about 84 wt. %, from about 82 wt. % to about 90 wt. %, from about 82 wt. % to about 88 wt. %, from about 82 wt. % to about 86 wt. %, from v82 wt. % to about 84 wt. %, from about 84 wt. % to about 90 wt. %, from about 84 wt. % to about 88 wt. %, or from about 84 wt. % to about 86 wt. % of the bisphenyl-A-epichlorohydrin epoxy resin based on the total weight of the epoxy resin portion of the cementing fluid 109. In some implementations, the epoxy resin includes from about 10 wt. % to about 20 wt. %, from about 10 wt. % to about 18 wt. %, from about 10 wt. % to about 16 wt. %, from about 10 wt. % to about 14 wt. %, from about 12 wt. % to about 20 wt. %, from about 12 wt. % to about 18 wt. %, from about 12 wt. % to about 16 wt. %, from about 12 wt. % to about 14 wt. %, from about 14 wt. % to about 20 wt. %, from about 14 wt. % to about 18 wt. %, or from about 14 wt. % to about 16 wt. % oxirane mono [(C12-C14)-alkyloxy) methyl] derivatives based on the total weight of the epoxy resin portion of the cementing fluid 109.

In some implementations, the epoxy resin including the bisphenol-A-(cpichlorohydrin) epoxy resin with the reactive diluent oxirane mono [(C12-C14)-alkyloxy) methyl] derivatives can have an epoxy value of from about 4.76 epoxy equivalents per kilogram of epoxy resin to about 5.26 epoxy equivalents per kilogram of epoxy resin. The epoxy resin including the bisphenol-A-(cpichlorohydrin) epoxy resin with the reactive diluent oxirane mono [(C12-C14)-alkyloxy) methyl] derivatives can have an epoxy equivalent weight of from about 190 g/eq to about 210 g/eq and a dynamic viscosity of from about 600 millipascal seconds (mPa·s) to about 1,200 mPa·s, or from about 600 mPa·s to about 900 mPa·s. In some implementations, the epoxy resin includes 2,3-epoxypropyl-o-tolyl ether, which can have an epoxy equivalent weight of from about 170 g/eq to 190 g/eq and exhibit a dynamic viscosity of from 7 mPa·s to 10 mPa·s. In other implementations, the epoxy resin may include alkyl glycidyl ethers having from 12 to 14 carbon atoms, which may have an epoxy equivalent weight of from about 270 g/eq to about 305 g/eq and can exhibit a dynamic viscosity of from about 5 mPa·s to about 12 mPa·s. In some implementations, the epoxy resin includes 1,6-hexanediol diclycidyl ether, which can have an epoxy equivalent weight of from about 150 g/eq to about 170 g/eq and can exhibit a dynamic viscosity of from about 20 mPa·s to about 30 mPa·s.

In some implementations, the cementing fluid 109 includes a plurality of epoxy resins. For example, in some implementations, the cementing fluid 109 includes a combination of two or more of bisphenol-A-epichlorohydrin epoxy resin, 2,3-epoxypropyl-o-tolyl ether, C12-C14 alkyl glycidyl ether, or 1,6-hexanediol diglycidyl ether epoxy resin. In some implementations, the epoxy resin includes a mixture of 1,6-hexanediol diglycidyl ether epoxy resin and bisphenol-A-epichlorohydrin epoxy resin with the reactive diluent oxirane mono [(C12-C14)-alkyloxy) methyl] derivatives.

The cementing fluid 109 includes an amount of the epoxy resin necessary to form a cured epoxy composition downhole. For example, the cementing fluid 109 can include from about 20 wt. % to about 99 wt. % of the epoxy resin based on the total weight of the cementing fluid 109 prior to curing and forming the solidified cement. In some implementations, the cementing fluid 109 includes from about 20 wt. % to about 97 wt. %, from about 20 wt. % to about 95 wt. %, from about 20 wt. % to about 90 wt. %, from about 20 wt. % to about 80 wt. %, from about 20 wt. % to about 60 wt. %, from about 40 wt. % to about 99 wt. %, from about 40 wt. % to about 97 wt. %, from about 40 wt. % to about 95 wt. %, from about 40 wt. % to about 90 wt. %, from about 40 wt. % to about 80 wt. %, from about 40 wt. % to about 60 wt. %, from about 60 wt. % to about 99 wt. %, from about 60 wt. % to about 97 wt. %, from about 60 wt. % to about 95 wt. %, from about 60 wt. % to about 90 wt. %, from about 60 wt. % to about 80 wt. %, from about 80 wt. % to about 99 wt. %, from about 80 wt. % to about 97 wt. %, from about 80 wt. % to about 95 wt. %, from about 80 wt. % to about 90 wt. %, from about 90 wt. % to about 99 wt. %, from about 90 wt. % to about 97 wt. %, or from about 90 wt. % to about 95 wt. % of the epoxy resin based on the total weight of the cementing fluid 109 prior to curing and forming the solidified cement.

As previously discussed, the cementing fluid 109 includes a curing agent to cure the epoxy resin. The curing agent can include at least one of an amine, polyamine, amine adduct, polyamine adduct, alkanolamine, amide, polyamide, polyamide adduct, polyamide imidazoline, polyaminoamides, phenalkamine, or any combinations of these. Examples of amines and polyamine curing agents include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, and amine adducts such as cycloaliphatic amine adducts or polyamine adducts. In some implementations, the curing agent includes trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), or any combinations of these. In some implementations, the curing agent includes DETA, TETA, TEPA, IPDA, or any combinations of these. In some implementations, the cementing fluid 109 includes a plurality of curing agents.

The cementing fluid 109 can include from about 1 wt. % to about 20 wt. % or from about 2 wt. % to about 30 wt. % of the curing agent(s). In some implementations, the cementing fluid 109 includes about 0.1 wt. % to about 50 wt. % curing agent(s). In some implementations, the cementing fluid 109 includes about 1.0 wt. % to about 40 wt. % curing agent(s). In some implementations, the cementing fluid 109 includes about 5.0 wt. % to about 30 wt. % curing agent(s). In some implementations, the cementing fluid 109 includes about 10 wt. % to about 25 wt. % curing agent(s). In some implementations, the cementing fluid 109 includes about 12 wt. % to about 20 wt. % curing agent(s).

In some implementations, the cementing fluid 109 includes about 1.0 wt. % to about 10 wt. % curing agent(s). In some implementations, the cementing fluid 109 includes about 1.5 wt. % to about 8.0 wt. % curing agent(s). In some implementations, the cementing fluid 109 includes about 2.0 wt. % to about 6.0 wt. % curing agent(s). In some implementations, the cementing fluid 109 includes about 2.0 wt. % to about 4.0 wt. % curing agent(s).

In some implementations, the cementing fluid 109 includes about 1.0 wt. % curing agent(s). In some implementations, the cementing fluid 109 includes about 1.5 wt. % curing agent(s). In some implementations, the cementing fluid 109 includes about 2.0 wt. % curing agent(s). In some implementations, the cementing fluid 109 includes about 2.1 wt. % curing agent(s). In some implementations, the cementing fluid 109 includes about 3.0 wt. % curing agent(s). In some implementations, the cementing fluid 109 includes about 4.0 wt. % curing agent(s). In some implementations, the cementing fluid 109 includes about 5.0 wt. % curing agent(s). In some implementations, the cementing fluid 109 includes about 6.0 wt. % curing agent(s). In some implementations, the cementing fluid 109 includes about 7.0 wt. % curing agent(s). In some implementations, the cementing fluid 109 includes about 8.0 wt. % curing agent(s). In some implementations, the cementing fluid 109 includes about 9.0 wt. % curing agent(s). In some implementations, the cementing fluid 109 includes about 10 wt. % curing agent(s).

In some implementations, the cementing fluid 109 includes about 11.0 wt. % curing agent(s). In some implementations, the cementing fluid 109 includes about 12.0 wt. % curing agent(s). In some implementations, the cementing fluid 109 includes about 13.0 wt. % curing agent(s). In some implementations, the cementing fluid 109 includes about 14.0 wt. % curing agent(s). In some implementations, the cementing fluid 109 includes about 15.0 wt. % curing agent(s). In some implementations, the cementing fluid 109 includes about 16.0 wt. % curing agent(s). In some implementations, the cementing fluid 109 includes about 17.0 wt. % curing agent(s). In some implementations, the cementing fluid 109 includes about 18.0 wt. % curing agent(s). In some implementations, the cementing fluid 109 includes about 19.0 wt. % curing agent(s). In some implementations, the cementing fluid 109 includes about 20 wt. % curing agent(s).

The curing agent can include an amine curing agent having an amine value that enables the amine curing agent to fully cure the cementing fluid 109 to form the solidified cement downhole. The amine value of a curing agent provides the active hydrogen (NH) content of an amine curing agent. The amine value can be expressed as the weight in milligrams of potassium hydroxide (KOH) needed to neutralize the NH in 1 gram of the amine curing agent. In some implementations, the curing agent has an amine value of from about 250 milligrams of KOH per gram (mg KOH/g) to about 1,700 mg KOH/g, from about 250 mg KOH/g to about 1,650 mg KOH/g, from about 250 mg KOH/g to about 1,600 mg KOH/g, from about 450 mg KOH/g to about 1,700 mg KOH/g, from about 450 mg KOH/g to about 1,650 mg KOH/g, from about 450 mg KOH/g to about 1,600 mg KOH/g, from about 650 mg KOH/g to about 1,700 mg KOH/g, from about 650 mg KOH/g to about 1,650 mg KOH/g, or from about 650 mg KOH/g to about 1,600 mg KOH/g. The amine value (VA) may be determined by titrating a solution of the curing agent with a dilute acid, such as a 1 molar (M) solution of hydrogen chloride (HCl). The amine value may then be calculated from the amount of HCl needed to neutralize the amine in the solution according to Equation 1 (EQU. 1):

$$V_A = \frac{V_{HCl} \times N_{HCl} \times MW_{KOH}}{W} \tag{EQU. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number (NA) of the known pure amine curing agent may be calculated from Equation 2 (EQU.2):

$$N_A = \frac{1,000 \times MW_{KOH}}{MW_{CA}} \tag{EQU. 2}$$

where $MW_{KOH}$ is the molecular weight of KOH in grams per mole and $MW_{CA}$ is the molecular weight of the curing agent in grams per mole.

In some implementations, the amine curing agent can have an amine hydrogen equivalent weight (AHEW) that enables the amine curing agent to fully cure the cementing fluid 109 to form the solidified cement downhole. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some implementations, the curing agent can be an amine curing agent having an AHEW of from about 20 grams (g) to about 120 g, from about 20 g to about 115 g, from about 20 g to about 110 g, from about 20 g to about 100 g, from about 40 g to about 120 g, from about 40 g to about 115 g, from about 40 g to about 110 g, from about 40 g to about 110 g, from about 60 g to about 120 g, from about 60 g to about 115 g, or from about 60 g to about 110 g.

The curing time of the cementing fluid 109 may be inversely proportional to the amount of curing agent in the cementing fluid 109. For example, increasing the amount of the curing agent in the cementing fluid 109 may result in a decrease in the curing time of the cementing fluid 109 to form the solidified cement. In some implementations, the cementing fluid 109 includes an amount of curing agent capable of curing the epoxy resin in the cementing fluid 109 to a semi-solid state (to form the solidified cement) in a cure time of from about 4 hours to about 9 hours or longer. As used in this disclosure, the term "semi-solid" refers to a state of the compositions that is between a liquid and a solid in which the composition exhibits high elasticity and flexibility. In the semi-solid state, the sealing composition may be easily deformed but may return to shape upon releasing the deforming force. The cementing fluid 109 cured to a semi-solid or solid state is capable of sealing an annulus or wall of the wellbore. In some implementations, the cementing fluid 109 includes an amount of the curing agent capable of curing the cementing fluid 109 to a semi-solid state (to form the solidified cement) within a cure time of from about 4 hours to about 6 hours. In some implementations, the cementing fluid 109 includes from about 0.1 wt. % to about 20 wt. % of the curing agent based on the total weight of the cementing fluid 109 prior to curing and forming the solidified cement. In some implementations, the cementing fluid 109 includes from about 0.1 wt. % to about 15 wt. %, from about 0.1 wt. % to about 10 wt. %, from about 0.1 wt. % to about 5 wt. %, from about 0.5 wt. % to about 20 wt. %, from about 0.5 wt. % to about 15 wt. %, from about 0.5 wt. % to about 10 wt. %, from about 0.5 wt. % to about 5 wt. %, from about 1 wt. % to about 20 wt. %, from about 1 wt. % to about 15 wt. %, from about 1 wt. % to about 10 wt. %, from about 1 wt. % to about 5 wt. %, from about 5 wt. % to about 20 wt. %, from about 5 wt. % to about 15 wt. %, from about 5 wt. % to about 10 wt. %, or from about 10 wt. % to about 20 wt. % of the curing agent based on the total weight of the cementing fluid 109 prior to curing and forming the solidified cement.

In some implementations, the cementing fluid 109 includes an additive to modify the speed of the reaction between the epoxy resin and the curing agent or to modify other properties of the cementing fluid 109, such as viscosity, yield point (YP), or other rheological properties. For example, the cementing fluid 109 can include an accelerator or a retarder to speed up or slow down, respectively, the reaction between the epoxy resin and the curing agent. Accelerators can include alcohols, phenols, aminoalcohols, or amines. Examples of accelerators include, but are not limited to benzyl alcohol, mono-nonylphenol, triethanolamine (TEA), amino-n-propyl diethanolamine, n,n-dimethyldipropylenetramine, or any combinations of these. Examples of retarders include, but are not limited to, lignin, gums, starches, lignosulphonate derivatives, or any combinations of these. In some implementations, the cementing fluid 109 includes an amount of the accelerator capable of decreasing the cure time of the cementing fluid 109 from greater than 12 hours to a cure time in a range of from about 1 hour to about 12 hours. In some implementations, the cementing fluid 109 includes from about 0.01 wt. % to about 10 wt. % of the accelerator based on the total weight of the cementing fluid 109 prior to curing and forming the solidified cement. In some implementations, the cementing fluid 109 includes from about 0.01 wt. % to about 5 wt. %, from about 0.01 wt. % to about 3 wt. %, from about 0.01 wt. % to about 1 wt. %, from about 0.1 wt. % to about 10 wt. %, from about 0.1 wt. % to about 5 wt. %, from about 0.1 wt. % to about 3 wt. %, from about 0.1 wt. % to about 1 wt. %, from about 1 wt. % to about 10 wt. %, from about 1 wt. % to about 5 wt. %, or from about 1 wt. % to about 3 wt. % of the accelerator based on the total weight of the cementing fluid 109 prior to curing and forming the solidified cement.

In some implementations, the cementing fluid 109 includes a weighting material. The weighting material can include particulate solids having a specific gravity (SG) that increases the density of the cementing fluid 109. The weighting material can be added to the cementing fluid 109 to increase the density of the final cured resin (solidified cement) to increase the hydrostatic pressure exerted by the solidified cement on the wellbore wall or interior surface of an outer tubular string. The final density of the cured resin (solidified cement) may depend on the geology of the subterranean formation. For example, the subterranean formation may require that the cementing fluid 109 have a greater density to support the wellbore and prevent flow of fluids from the subterranean formation into the wellbore during curing of the cementing fluid 109 to form the solidified cement. The weighting material can have a specific gravity (SG) of from about 2 to about 6. Examples of weighting materials include, but are not limited to, sand, barite (barium sulfate), hematite, calcium carbonate, siderite, ilmenite, silica sand, manganese oxide (MnO), hausmanite (manganese tetraoxide ($Mn_3O_4$), zinc oxide, zirconium oxide, iron oxide, fly ash, or any combinations of these. In some implementations, the cementing fluid 109 includes from about 0.1 wt. % to about 40 wt. % of the weighting material based on the total weight of the cementing fluid 109 prior to curing and forming the solidified cement. In some implementations, the cementing fluid 109 includes from about 0.1 wt. % to about 30 wt. %, from about 0.1 wt. % to about 20 wt. %, from about 0.1 wt. % to about 10 wt. %, from about 1 wt. % to about 40 wt. %, from about 1 wt. % to about 30 wt. %, from about 1 wt. % to about 20 wt. %, from about 1 wt. % to about 10 wt. %, from about 5 wt. % to about 40 wt. %, from about 5 wt. % to about 30 wt. %, from about 5 wt. % to about 20 wt. %, from about 5 wt. % to about 10 wt. %, from about 10 wt. % to about 40 wt. %, from about 10 wt. % to about 30 wt. %, from about 10 wt. % to about 20 wt. %, or from about 20 wt. % to about 40 wt. % of the weighting material based on the total weight of the cementing fluid 109 prior to curing and forming the solidified cement.

In some implementations, the cementing fluid 109 can include a modifier, such as cardanol liquid, polyacrylate flow agents, or any combinations of these. A modifier can be added to the cementing fluid 109 to adjust the viscosity of the cementing fluid 109.

In some implementations, the cementing fluid 109 includes from about 20 wt. % to about 97 wt. % of the epoxy resin and from about 1 wt. % to about 20 wt. % of the curing agent based on the total weight of the composition, where the epoxy resin includes at least one of 2,3-epoxypropyl o-tolyl ether, alkyl glycidyl ethers having from 12 to 14 carbon atoms, or the compound having formula (I). In some implementations, the cementing fluid 109 includes from about 20 wt. % to about 97 wt. % of bisphenol-A-epichlorohydrin epoxy resin with the reactive diluent oxirane mono [(C12-C14)-alkyloxy) methyl] derivatives and from about 1 wt. % to about 20 wt. % of TEPA (curing agent). In some implementations, the cementing fluid 109 includes from about 10 wt. % to about 80 wt. % of bisphenol-A-epichlorohydrin epoxy resin with the reactive diluent oxirane mono [(C12-C14)-alkyloxy) methyl] derivatives, from about 10 wt. % to about 80 wt. % of 1,6-hexanediol diglycidyl ether, and from about 1 wt. % to about 20 wt. % of TEPA (curing agent). In some implementations, the cementing fluid 109 includes from about 1 wt. % to about 40 wt. % of $Mn_3O_4$ weighting material.

In some implementations, the cementing fluid 109 exhibits a cure time of greater than or equal to about 4 hours, greater than or equal to about 5 hours, or greater than or equal to about 6 hours. In some implementations, the cementing fluid 109 exhibits a cure time of less than or equal to about 12 hours, less than or equal to about 10 hours, or less than or equal to about 9 hours. In some implementations, the cementing fluid 109 exhibits a cure time of from about 4 hours to about 12 hours, from about 4 hours to about 10 hours, from about 4 hours to about 9 hours, from about 4 hours to about 6 hours, from about 5 hours to about 12 hours, from about 5 hours to about 10 hours, from about 5 hours to about 9 hours, from about 6 hours to about 12 hours, from about 6 hours to about 10 hours, from about 6 hours to about 9 hours, from about 9 hours to about 12 hours, or from about 10 hours to about 12 hours.

In some implementations, a method of cementing a well includes introducing a spacer fluid into the wellbore and introducing a cementing fluid 109 into the wellbore. The method can include curing the cementing fluid 109 to form a cured composition (e.g., solidified cement) to secure a tubular within the well. The cementing fluid 109 can be used for scaling an annulus of a wellbore under a range of different downhole conditions in the wellbore. For example, the cementing fluid 109 can be adapted to different downhole conditions by changing the concentrations of the epoxy resin, curing agent, accelerator, emulsifier, weighting material, or any combinations of these in the cementing fluid 109 to modify the specific gravity, viscosity, mechanical properties, curing time, or other properties of the cementing fluid 109. The solidified cement formed by curing the cementing fluid 109 downhole can be capable of withstanding a wide range of temperatures and pressures without failing or deteriorating. For example, once the cementing fluid 109 has cured and formed the solidified cement, the solidified cement can be capable of withstanding temperatures of from about 20 degrees Celsius (C) to about 205° C. The solidified cement can be able to withstand temperature cycling within a temperature range of from about 20° C. to about 205° C. The solidified cement can be capable of withstanding pressures of up to about 4,000,000 pounds of force per square inch (psi) (about 27,579,029 kilopascals (kPa)). For example, the solidified cement can be capable of withstanding pressures of from about 14 psi (about 97 kPa) to about 4,000,000 psi (about 27,579,029 kPa) without failing or deteriorating.

When used as a scaling composition, the cementing fluid 109 can have a viscosity that enables the cementing fluid 109 to be transferred into an annulus between an exterior surface of a tubular disposed within the well and a wellbore wall or interior surface of a second tubular surrounding the first tubular. In some implementations, the cementing fluid 109 has a viscosity that enables introduction of the cementing fluid 109 into a cementing area (such as an annulus between a tubular and a wellbore wall or an annulus between two concentric tubulars) of the well. In some implementations, the cementing fluid 109 has a high viscosity that enables injection of the cementing fluid 109 into the subterranean formation, such as a high-injectivity zone of the well. The rheology and density of the cementing fluid 109 can be adjusted over a wide range of values depending on the requirement for the well and the downhole conditions of the well. The cementing fluid 109 can have a density that enables the cementing fluid 109 to exert hydrostatic pressure on the wellbore wall or interior surface of an outer casing to support the wellbore, prevent fluids from flowing from the subterranean formation into the wellbore, or both. In some implementations, the cementing fluid 109 can have a density of from about 55 pounds per cubic foot (lbm/ft³) to about 170 lbm/ft³ measured immediately after addition of the curing agent and before substantial curing has occurred. As used in this disclosure, the term "substantial curing" refers to an amount of curing that produces a change of greater than 5 percent (%) in any rheological property of the cementing fluid 109. In some implementations, the cementing fluid 109 can have a density of from about 55 lbm/ft³ to about 150 lbm/ft³, from about 55 lbm/ft³ to about 130 lbm/ft³, from about 55 lbm/ft³ to about 110 lbm/ft³, from about 55 lbm/ft³ to 90 about lbm/ft³, from about 60 lbm/ft³ to about 170 lbm/ft³, from about 60 lbm/ft³ to about 150 lbm/ft³, from about 60 lbm/ft³ to about 130 lbm/ft³, about 60 lbm/ft³ to about 110 lbm/ft³, from about 60 lbm/ft³ to about 90 lbm/ft³, from about 80 lbm/ft³ to about 170 lbm/ft³, from about 80 lbm/ft³ to about 130 lbm/ft³, from about 80 lbm/ft³ to about 110 lbm/ft³, from 90 about lbm/ft³ to 150 about lbm/ft³, or from about 90 lbm/ft³ to about 130 lbm/ft³.

The viscosity of the cementing fluid 109 may be increased sufficiently to enable the solidified cement formed by curing the cementing fluid 109 to cement a tubular utilizing emulsifiers. In some implementations, the cementing fluid 109 includes about 0.01 wt. % to about 50 wt. % emulsifier(s). In some implementations, the cementing fluid 109 includes about 0.1 wt. % to about 40 wt. % emulsifier(s). In some implementations, the cementing fluid 109 includes about 1.0 wt. % to about 30 wt. % emulsifier(s). In some implementations, the cementing fluid 109 includes about 5.0 wt. % to about 25 wt. % emulsifier(s). In some implementations, the cementing fluid 109 includes about 10 wt. % to about 20 wt. % emulsifier(s). Some non-limiting examples of emulsifiers that can be included in the cementing fluid 109 include oxyethylated alkyl phenol, ethoxylated phenol in water, carboxylic acid terminated fatty polyamide in biodiesel base, carboxylic acid terminated fatty polyamide, modified amidoamine in low-toxicity mineral oil, polyolefin amide alkene amine, unbleached soya lecithin, distilled tall oil fatty acid, carboxylic acid terminated fatty polyamide in diesel base, a mixture of modified tall oil and carboxylic acid terminated fatty polyamide, carboxylic acid terminated fatty polyamide, oxidized tall oil/fatty amidoamine blend in diesel base, oxidized tall oil/fatty amidoamine blend, ether carboxylic acid, aqueous mixtures of glycols, phosphate ester, and ethanolamine, and transesterified diethanolamine.

In some implementations, the components of the cementing fluid 109 are mixed in a lab. For example, the red mud, the epoxy resin, and the curing agent are maxed using a standard API blender for 15 seconds at 4,000 revolutions per minute (rpm) and 35 seconds at 12,000 rpm. The equation for calculating mixing energy is shown by Equation 3 (EQU.3):

$$\frac{E}{M} = \frac{k\omega^2 t}{V} \quad \text{(EQU. 3)}$$

where E is mixing energy in kiloJoules (kJ), M is mass of slurry in kilograms (kg), k is an empirical constant equal to $6.1 \times 10^{-8}$ m³/s, ω is rotational speed in radians per second (rad/s), t is mixing time in seconds(s), and V is slurry volume in cubic meters (m³).

In some implementations, the cementing fluid 109 exhibits a thickening time at 100 degrees Fahrenheit (° F.)(37.8° C.) of greater than about 1 hour, greater than about 1.5 hours, greater than about 1.75 hours, greater than about 2 hours, or greater than about 6 hours. A thickening time test can be performed to simulate pumping conditions in order to determine a duration of time before the cementing fluid 109 becomes too difficult or impossible to pump (flow).

The viscosity of the cementing fluid 109 can be measured using a standard oilfield viscometer, such as a FANN® Model 35 viscometer manufactured by Fann Instrument Company, for example, according to test methods provided in the API Recommended Practice For Field Testing Water-Based Cement slurries (RP 13B-1/ISO 10414-1:2002). The viscometer reports shear stress readings at various shear rates. The shear stress readings can be reported in units of pounds of force per 100 square feet (lbf/100 ft²) (4.79 dyne/cm²). The shear rate can be measured in rpm. The viscometer may report shear stress readings at shear rates of at least one of 600 rpm, 300 rpm, 200 rpm, 100 rpm, 6 rpm, or 3 rpm. These shear stress readings may be used to determine the viscosity of the cementing fluid 109 at any of the shear rates, using Equation 4 (EQU.4), assuming a viscometer with an $R^1$ rotor sleeve, B1 bob, and F1 torsion spring:

$$\mu = \frac{300\theta_N}{N} \qquad \text{(EQU. 4)}$$

where μ is viscosity in centipoise (cP), N is viscometer speed/shear rate in rpm, and ON is shear stress in lbf/100 ft² (4.79 dyne/cm²).

The rheology of cementing fluid 109 can be modeled based on Bingham plastic flow behavior. In particular, the cementing fluid 109 including red mud behaves as a rigid body at lesser shear stress but flows as a viscous fluid at greater shear stress. The rheological behavior of the cementing fluid 109 can be determined by measuring the shear stress on the cementing fluid 109 at different shear rates, which can be accomplished by measuring the shear stress and/or shear rate on the cementing fluid 109, for example, using a FANN® Model 35 viscometer operated at 3 rpm, 6 rpm, 100 rpm, 200 rpm, 300 rpm, or 600 rpm. A Bingham plastic fluid can be modeled by Equation 5 (EQU.5):

$$\tau=(PV)\dot{\gamma}+4.79YP \qquad \text{(EQU.5)}$$

where τ is shear stress in dynes per square centimeter (dyne/cm²), PV is plastic viscosity in cP, $\dot{\gamma}$ is shear rate is per second (s⁻¹), and YP is yield point in lbf/100 ft² (4.79 dyne/cm²).

The rheology of the cementing fluid 109 can be evaluated from the plastic viscosity (PV) and the yield point (YP), which are parameters from the Bingham plastic rheology model. The PV is related to the resistance of the cementing fluid 109 to flow due to mechanical interaction between the solids of the cementing fluid 109 and represents the viscosity of the cementing fluid 109 extrapolated to infinite shear rate. In other words, the PV is the slope of the shear stress versus shear rate curve of the Bingham plastic model. The PV reflects the type and concentration of the solids in the cementing fluid 109, and a lesser PV is preferred. The PV of the cementing fluid 109 can be estimated by measuring the shear stress of the cementing fluid 109, for example, using a FANN® Model 35 viscometer at shear rates of 300 rpm and 600 rpm and subtracting the 300 rpm shear stress measurement from the 600 rpm shear stress measurement according to Equation 6 (EQU.6):

$$PV=\theta_{600}-\theta_{300} \qquad \text{(EQU.6)}$$

where PV is plastic viscosity in cP, $\theta_{600}$ is shear stress at 600 rpm in lbf/100 ft² (4.79 dyne/cm²), and $\theta_{300}$ is shear stress at 300 rpm in lbf/100 ft² (4.79 dyne/cm²).

The YP represents the shear stress less than which the cementing fluid 109 behaves as a rigid body and greater than which the cementing fluid 109 flows as a viscous fluid. In other words, the YP represents the amount of stress required to move the cementing fluid 109 from a static condition. The yield point is the resistance of initial flow of a fluid, or the stress required in order to move the fluid. It can be simply stated that the yield point is the attractive force among colloidal particles in the cementing fluid 109. The YP of the cementing fluid 109 is correlated with the capacity of the cementing fluid 109 to carry rock cuttings through the annulus, which in simplified terms indicates the hole-cleaning ability of the cementing fluid 109. The determination of yield points in the cementing fluid 109 is important in the overall description of slurry flow properties. Yield point affects both the start-up pressure after a temporary shutdown and the void filling properties of the cementing fluid 109 during sealing operations. The YP of the cementing fluid 109 can be estimated by Equation 7 (EQU.7) by subtracting the PV from Equation 5 (EQU.5) from the shear stress of the cementing fluid 109 measured at 300 rpm (EQU.6):

$$YP=\theta_{300}-PV \qquad \text{(EQU.7)}$$

FIG. 2 is a progression 200 of schematics depicting example stages of cementing a well 201. At stage (i), a wellbore 203 has been formed (for example, drilled by the system 100), and a tubular 205 (such as a tubing or casing) has been disposed within the wellbore 203. At stage (ii), a cementing fluid (such as the cementing fluid 109) is flowed into an annulus between an exterior surface of the tubular 205 and a wall of the wellbore 203. At stage (iii), the cementing fluid 109 has cured to form solidified cement 109'. The solidified cement 109' secures the position of the tubular 205 within the wellbore 203.

Figure 3:
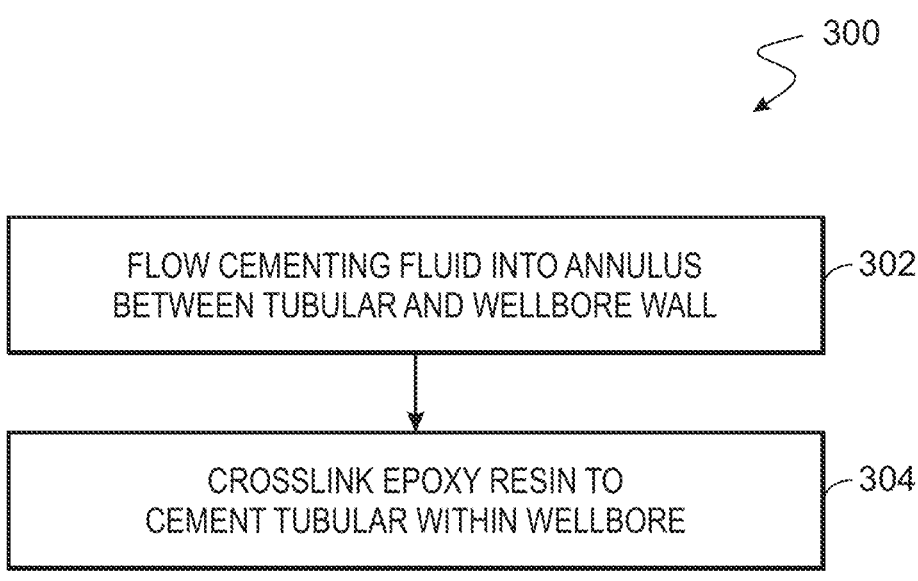
FIG. 3 is a flow chart of an example method for cementing a well.

FIG. 3 is a flow chart of an example method 300 for cementing a well (such as the well 201). At block 302, a cementing composition (such as the cementing fluid 109) is flowed into an annulus between a tubular (such as the tubular 205) and a wall of a wellbore (such as the wellbore 203). In some implementations, the cementing fluid 109 is applied to a casing at block 302. In some implementations, the cementing fluid 109 is applied to a casing-casing annulus at block 302. As described previously, the cementing fluid 109 includes red mud, an epoxy resin, and a curing agent that includes nitrogen. The cementing fluid 109 can be flowed to the annulus at block 302, for example, by the circulation system 108. At block 304, the curing agent of the cementing fluid 109 crosslinks the epoxy resin, thereby curing the cementing fluid 109 and cementing the tubular 205 within the wellbore 203 in response to exposure to a downhole condition (such as a downhole temperature in a range of from about 20 degrees Celsius (° C.) to about 205° C.) of the wellbore 203. Crosslinking the epoxy resin at block 304 produces solidified cement 109' which secures the location of the tubular 205 within the wellbore 203. In some implementations, block 304 includes maintaining the cementing fluid 109 within the annulus for a time duration sufficient for the curing agent to crosslink the epoxy resin, thereby curing the cementing fluid 109 (forming the solidified cement 109') and cementing the tubular 205 within the wellbore 203. In some implementations, the cementing fluid 109 is maintained within the annulus at block 304 for a time duration sufficient for the curing agent to crosslink the epoxy resin, such that the cementing fluid 109 becomes viscous and un-pumpable. In some implementations, the time duration for which the cementing fluid 109 is maintained within the annulus at block 304 for the curing agent to crosslink the epoxy resin is in a range of from about 4 hours to about 12 hours.

In some implementations, the solidified cement 109' is capable of withstanding about 10 psi (about 69 kPa) to about 5,000,000 psi (about 34,473,786 kPa) without failing or deteriorating to allow liquids or gases to penetrate into or through the solidified cement 109'. In some implementations, the solidified cement 109' is capable of withstanding about 14 psi (about 97 kPa) to about 4,000,000 psi (about 27,579,029 kPa) without failing or deteriorating to allow liquids or gases to penetrate into or through the solidified cement 109'. In some implementations, the solidified cement 109' is capable of withstanding about 1,000 psi (about 6,895 kPa) to about 3,500,000 psi (about 24,131,651 kPa) without failing or deteriorating to allow liquids or gases to penetrate into or through the solidified cement 109'. In some implementations, the solidified cement 109' is capable of withstanding about 10,000 psi (about 68,948 kPa) to about 3,000,000 psi (about 20,684,272 kPa) without failing or deteriorating to allow liquids or gases to penetrate into or through the solidified cement 109'. In some implementations, the solidified cement 109' is capable of withstanding about 100,000 psi (about 689,476 kPa) to about 2,500,000 psi (about 17,236,893 kPa) without failing or deteriorating to allow liquids or gases to penetrate into or through the solidified cement 109'. In some implementations, the solidified cement 109' is capable of withstanding about 1,000,000 psi (about 6,894,757 kPa) to about 2,000,000 psi (about 13,789,515 kPa) without failing or deteriorating to allow liquids or gases to penetrate into or through the solidified cement 109'

In some implementations, the solidified cement 109' is capable of withstanding about 10 psi (about 69 kPa) without failing or deteriorating to allow liquids or gases to penetrate into or through the solidified cement 109'. In some implementations, the solidified cement 109' is capable of withstanding about 14 psi (about 97 kPa) without failing or deteriorating to allow liquids or gases to penetrate into or through the solidified cement 109'. In some implementations, the solidified cement 109' is capable of withstanding about 1,000 psi (about 6,895 kPa) without failing or deteriorating to allow liquids or gases to penetrate into or through the solidified cement 109'. In some implementations, the solidified cement 109' is capable of withstanding about 10,000 psi (about 68,948 kPa) without failing or deteriorating to allow liquids or gases to penetrate into or through the solidified cement 109'. In some implementations, the solidified cement 109' is capable of withstanding about 100,000 psi (about 689,476 kPa) without failing or deteriorating to allow liquids or gases to penetrate into or through the solidified cement 109'. In some implementations, the solidified cement 109' is capable of withstanding about 1,000,000 psi (about 6,894,757 kPa) without failing or deteriorating to allow liquids or gases to penetrate into or through the solidified cement 109'. In some implementations, the solidified cement 109' is capable of withstanding about 1,500,000 psi without failing or deteriorating to allow liquids or gases to penetrate into or through the solidified cement 109'. In some implementations, the solidified cement 109' is capable of withstanding about 2,000,000 psi (about 13,789,515 kPa) without failing or deteriorating to allow liquids or gases to penetrate into or through the solidified cement 109'. In some implementations, the solidified cement 109' is capable of withstanding about 2,500,000 psi (about 17,236,893 kPa) without failing or deteriorating to allow liquids or gases to penetrate into or through the solidified cement 109'. In some implementations, the solidified cement 109' is capable of withstanding about 3,000,000 psi (about 20,684,272 kPa) without failing or deteriorating to allow liquids or gases to penetrate into or through the solidified cement 109'. In some implementations, the solidified cement 109' is capable of withstanding about 3,500,000 psi (about 24, 131,651 kPa) without failing or deteriorating to allow liquids or gases to penetrate into or through the solidified cement 109'. In some implementations, the solidified cement 109' is capable of withstanding about 4,000,000 psi (about 27,579,029 kPa) without failing or deteriorating to allow liquids or gases to penetrate into or through the solidified cement 109'. In some implementations, the solidified cement 109' is capable of withstanding about 4,500,000 psi without failing or deteriorating to allow liquids or gases to penetrate into or through the solidified cement 109'. In some implementations, the solidified cement 109' is capable of withstanding about 5,000,000 psi (about 34,473,786 kPa) without failing or deteriorating to allow liquids or gases to penetrate into or through the solidified cement 109'.

In some implementations, the solidified cement 109' is capable of withstanding temperatures of about 10° C. to about 225° C. without failing or deteriorating to allow liquids or gases to penetrate into or through the solidified cement 109'. In some implementations, the solidified cement 109' is capable of withstanding temperatures of about 20° C. to about 205° C. without failing or deteriorating to allow liquids or gases to penetrate into or through the solidified cement 109'. In some implementations, the solidified cement 109' is capable of withstanding temperatures of about 40° C. to about 200° C. without failing or deteriorating to allow liquids or gases to penetrate into or through the solidified cement 109'. In some implementations, the solidified cement 109' is capable of withstanding temperatures of about 60° C. to about 180° C. without failing or deteriorating to allow liquids or gases to penetrate into or through the solidified cement 109'. In some implementations, the solidified cement 109' is capable of withstanding temperatures of about 80° C. to about 160° C. without failing or deteriorating to allow liquids or gases to penetrate into or through the solidified cement 109'. In some implementations, the solidified cement 109' is capable of withstanding temperatures of about 100° C. to about 140° C. without failing or deteriorating to allow liquids or gases to penetrate into or through the solidified cement 109'.

In some implementations, the solidified cement 109' is capable of withstanding temperatures of about 20° C. without failing or deteriorating to allow liquids or gases to penetrate into or through the solidified cement 109'. In some implementations, the solidified cement 109' is capable of withstanding temperatures of about 40° C. without failing or deteriorating to allow liquids or gases to penetrate into or through the solidified cement 109'. In some implementations, the solidified cement 109' is capable of withstanding temperatures of about 60° C. without failing or deteriorating to allow liquids or gases to penetrate into or through the solidified cement 109'. In some implementations, the solidified cement 109' is capable of withstanding temperatures of about 80° C. without failing or deteriorating to allow liquids or gases to penetrate into or through the solidified cement 109'. In some implementations, the solidified cement 109' is capable of withstanding temperatures of about 100° C. without failing or deteriorating to allow liquids or gases to penetrate into or through the solidified cement 109'. In some implementations, the solidified cement 109' is capable of withstanding temperatures of about 120° C. without failing or deteriorating to allow liquids or gases to penetrate into or through the solidified cement 109'. In some implementations, the solidified cement 109' is capable of withstanding temperatures of about 140° C. without failing or deteriorating to allow liquids or gases to penetrate into or through the solidified cement 109'. In some implementations, the solidified cement 109' is capable of withstanding temperatures of about 160° C. without failing or deteriorating to allow liquids or gases to penetrate into or through the solidified cement 109'. In some implementations, the solidified cement 109' is capable of withstanding temperatures of about 180° C. without failing or deteriorating to allow liquids or gases to penetrate into or through the solidified cement 109'. In some implementations, the solidified cement 109' is capable of withstanding temperatures of about 200° C. without failing or deteriorating to allow liquids or gases to penetrate into or through the solidified cement 109'. In some implementations, the solidified cement 109' is capable of withstanding temperatures of about 205° C. without failing or deteriorating to allow liquids or gases to penetrate into or through the solidified cement 109'. In some implementations, the solidified cement 109' is capable of withstanding temperatures of about 225° C. without failing or deteriorating to allow liquids or gases to penetrate into or through the solidified cement 109'

Analysis of Red Mud Sample

Wavelength Dispersive X-ray Fluorescence (WDXRF) was used to conduct elemental analysis. In WDXRF spectrometers, all of the elements in the sample are excited simultaneously. The different energies of the characteristic radiation emitted from the sample are diffracted into different directions by an analyzing crystal or monochrometer (similar to the action of a prism dispersing different colors of visible light into different directions). By placing the detector at a certain angle, the intensity of X-rays with a certain wavelength can be measured. Sequential spectrometers use a moving detector on a goniometer to move it through an angular range to measure the intensities of many different wavelengths. Simultaneous spectrometers are equipped with a set of fixed detection systems, where each system measures the radiation of a specific element.

For the WDXRF analysis, a sample of red mud was homogenized and manually grounded by an agate mortar and a pestle for several minutes to achieve fine particle size. 4 grams of the red mud powder was then mixed well and homogenized with 0.9 grams of a binder (Licowax C micropowder PM (Hoechstwax)). The powder was then pressed with 20 tons of pressure to a pellet with 31 millimeter (mm) diameter. WDXRF analysis was then performed on the sample using the standardless Omnian 27 method. The composition of oxides in the sample of red mud is shown in Table 1. Elemental analysis of 10 different samples of red mud were performed, and the results of the elemental analysis are provided in Table 2. The elemental analysis (Table 2) shows that the sample included a large amount of sodium.

TABLE 1

| XRF results of oxide content of red mud sample | |
| --- | --- |
| Oxide | Weight percent (wt. %) |
| Calcium oxide (CaO) | 5.59 |
| Silicon dioxide ($SiO_2$) | 15.12 |
| Aluminum oxide ($Al_2O_3$) | 25.65 |
| Iron oxide ($Fe_2O_3$) | 30.74 |
| Magnesium oxide (MgO) | 0.17 |
| Potassium oxide ($K_2O$) | 0.04 |

TABLE 2

Elemental analysis of red mud samples

| | Weight percent (wt. %) | | | | | | | | | | |
| --- | --- | --- | --- | --- | --- | --- | --- | --- | --- | --- | --- |
| Element | Sample 1 | Sample 2 | Sample 3 | Sample 4 | Sample 5 | Sample 6 | Sample 7 | Sample 8 | Sample 9 | Sample 10 | Average |
| O | 33.900 | 33.800 | 33.700 | 33.900 | 33.900 | 33.800 | 33.800 | 33.960 | 33.900 | 33.900 | 33.856 |
| Na | 33.300 | 33.500 | 33.600 | 33.800 | 33.870 | 33.740 | 33.670 | 33.800 | 33.500 | 33.500 | 33.628 |
| Fe | 11.900 | 11.800 | 11.300 | 11.470 | 11.340 | 11.530 | 11.600 | 11.440 | 11.600 | 11.620 | 11.560 |
| Al | 6.600 | 6.700 | 6.800 | 6.740 | 6.830 | 6.720 | 6.750 | 6.720 | 6.729 | 6.850 | 6.744 |
| Si | 3.800 | 3.800 | 3.900 | 3.890 | 3.920 | 3.915 | 3.906 | 3.890 | 3.913 | 3.932 | 3.887 |
| Ca | 3.100 | 3.100 | 3.000 | 3.037 | 3.010 | 3.053 | 3.080 | 3.060 | 3.104 | 3.036 | 3.058 |
| Ti | 3.000 | 3.000 | 3.000 | 2.990 | 2.970 | 2.972 | 2.980 | 3.020 | 2.984 | 3.024 | 2.994 |
| S | 2.100 | 2.000 | 2.100 | 2.090 | 2.100 | 2.124 | 2.080 | 2.087 | 2.167 | 2.094 | 2.094 |
| F | 0.800 | 0.800 | 1.000 | 0.980 | 0.960 | 1.100 | 0.954 | 0.944 | 0.963 | 0.917 | 0.942 |
| Cl | 0.300 | 0.400 | 0.400 | 0.403 | 0.370 | 0.390 | 0.396 | 0.385 | 0.411 | 0.424 | 0.388 |
| Sr | 0.100 | 0.100 | 0.142 | 0.140 | 0.139 | 0.140 | 0.142 | 0.142 | 0.142 | 0.142 | 0.133 |
| Zr | 0.100 | 0.100 | 0.135 | 0.132 | 0.130 | 0.130 | 0.132 | 0.132 | 0.131 | 0.131 | 0.125 |
| P | 0.090 | 0.090 | 0.097 | 0.092 | 0.095 | 0.090 | 0.097 | 0.096 | 0.100 | 0.096 | 0.094 |
| Mg | 0.070 | 0.080 | 0.074 | 0.068 | 0.070 | 0.072 | 0.070 | 0.077 | 0.073 | 0.073 | 0.073 |
| Cr | 0.060 | 0.050 | 0.058 | 0.057 | 0.060 | 0.060 | 0.058 | 0.057 | 0.058 | 0.057 | 0.058 |

Table 3 provides non-limiting examples of epoxy resins that can be included in the cementing fluid 109. Table 4 provides non-limiting examples of curing agents that can be included in the cementing fluid 109.

TABLE 3

Epoxy resin examples

| Epoxy Resin ID | Epoxy Resin Name |
|---|---|
| Resin 1: RAZEEN 2254 | bisphenol-A-epichlorohydrin epoxy resin with the reactive diluent oxirane mono [(C12-C14)-alkyloxy)methyl] derivatives |
| Resin 2 | 2,3-epoxypropyl-o-tolyl ether |
| Resin 3: RAZEEN 7106 | C12-C14 alkyl glycidyl ether |
| Resin 4 | 1,6-hexanediol diglycidyl ether |
| Resin 5: WellLock R1 | Bisphenol A/Epichlorohydrin resin and butyl glycidyl ether resin |
| Resin 6 | Bispenol A/Epichlorohydrin and butyl glycidyl ether and cyclohexanedimethanol resins |
| Resin 7: WellLock R2 | Cyclohexanedimethanol diglydicyl ether |

TABLE 4

Curing agent examples

| Curing Agent ID | Composition |
|---|---|
| Curing Agent 1: RAZEEN CURE | 90-100% diethylenetriamine |
| Curing Agent 2: WellLock H1 | Diethyltoluenediamine |
| Curing Agent 3 | Polyoxypropylene diamine |

Table 5 provides the composition of Formulation #1. Formulation #1 had a density of 74 pounds per cubic foot (lb/ft$^3$) (1,185.4 kilograms per cubic meter (kg/m$^3$)). Table 6 provides the composition of Formulation #2. Formulation #2 had a density of 72 lb/ft$^3$ (1,153.3 kg/m$^3$).

TABLE 5

Composition of Formulation #1

| Component | Weight percent (wt. %) | Weight (grams, g) |
|---|---|---|
| Resin 1: Resin-2254 | 84.4 | 100 |
| Curing Agent 1: Razeen Cure-931 | 2.1 | 2.5 |
| Red Mud | 13.5 | 16 |

EXAMPLES

TABLE 6

Composition of Formulation #2

| Component | Weight percent (wt. %) | Weight (grams, g) |
|---|---|---|
| Resin 1: Resin-2254 | 88.1 | 100 |
| Curing Agent 1: Razeen Cure-931 | 3.5 | 4 |
| Red Mud | 8.4 | 9.5 |

The rheology of Formulation #1 was analyzed. The results of the rheology testing (performed at room temperature) of Formulation #1 are provided in Table 7.

TABLE 7

Rheology testing of Formulation #1

| Shear Rate (rpm) | Shear Stress (dyne/cm$^2$) |
|---|---|
| 300 | Out of range |
| 200 | Out of range |
| 100 | Out of range |
| 60 | 207 |
| 30 | 109 |
| 6 | 27 |
| 3 | 15 |
| 10 seconds | 15 |
| 10 minutes | 15 |

Thickening times of Formulations #1 and #2 were analyzed. The results of the thickening time testing (performed visually at room temperature) of Formulations #1 and #2 are provided in Table 8.

TABLE 8

Thickening times for Formulations #1 and #2

| Test Sample | Time for sample to begin gelling and become viscous/un-pumpable | Thickening time to completely rigid material |
|---|---|---|
| Formulation #1 | 8 hours | 35 hours |
| Formulation #2 | 4 hours | 7-8 hours |

EMBODIMENTS

In an example implementation (or aspect), a method comprises: flowing a cementing composition into an annulus between a tubular disposed within a wellbore formed in a subterranean formation and a wall of the wellbore, wherein the cementing composition comprises red mud, an epoxy resin, and a curing agent comprising nitrogen; and cross-linking, by the curing agent, the epoxy resin to solidify the cementing composition in response to exposure to a down-hole condition of the wellbore, thereby cementing the tubular within the wellbore.

In an example implementation (or aspect) combinable with any other example implementation (or aspect), a concentration of the red mud in the cementing composition is in a range of from about 0.1 weight percent (wt. %) to about 50 wt. %.

In an example implementation (or aspect) combinable with any other example implementation (or aspect), a concentration of the epoxy resin in the cementing composition is in a range of from about 20 wt. % to about 99 wt. %.

In an example implementation (or aspect) combinable with any other example implementation (or aspect), a concentration of the curing agent in the cementing composition is in a range of from about 0.1 wt. % to about 20 wt. %.

In an example implementation (or aspect) combinable with any other example implementation (or aspect), wherein the epoxy resin has an epoxy value in a range of from 4.5 epoxy equivalents per kilogram of the epoxy resin to 5.5 epoxy equivalents per kilogram of the epoxy resin, wherein the epoxy equivalent is the weight of the epoxy resin in grams that contain one equivalent weight of epoxy, wherein the equivalent weight of epoxy is the molecular weight of the epoxy resin divided by an average number of epoxy groups in the epoxy resin.

In an example implementation (or aspect) combinable with any other example implementation (or aspect), the curing agent has an amine value in a range of from about 250 milligrams of potassium hydroxide per gram (mg KOH/g) to about 1,700 mg KOH/g, wherein the amine value is a weight of potassium hydroxide in milligrams needed to neutralize one gram of the curing agent.

In an example implementation (or aspect) combinable with any other example implementation (or aspect), the curing agent has an amine hydrogen equivalent weight (AHEW) in a range of from about 20 grams (g) to about 120 g, wherein the AHEW is the molecular weight of the curing agent divided by a number of active hydrogens per molecule of the curing agent.

In an example implementation (or aspect) combinable with any other example implementation (or aspect), the cementing composition is maintained within the annulus for a curing time in a range of from about 4 hours to about 12 hours, such that the curing agent crosslinks the epoxy resin.

In an example implementation (or aspect), a composition, for cementing a wellbore, comprises: red mud; an epoxy resin; and a curing agent comprising nitrogen, wherein the curing agent is configured to crosslink the epoxy resin to solidify the composition in response to exposure to a downhole condition of the wellbore, thereby cementing the wellbore.

In an example implementation (or aspect) combinable with any other example implementation (or aspect), a concentration of the red mud in the composition is in a range of from about 0.1 weight percent (wt. %) to about 50 wt. %.

In an example implementation (or aspect) combinable with any other example implementation (or aspect), a concentration of the epoxy resin in the composition is in a range of from about 20 weight percent (wt. %) to about 99 wt. %.

In an example implementation (or aspect) combinable with any other example implementation (or aspect), a concentration of the curing agent in the composition is in a range of from about 0.1 weight percent (wt. %) to about 20 wt. %.

In an example implementation (or aspect) combinable with any other example implementation (or aspect), the epoxy resin has an epoxy value in a range of from 4.5 epoxy equivalents per kilogram of the epoxy resin to 5.5 epoxy equivalents per kilogram of the epoxy resin, wherein the epoxy equivalent is the weight of the epoxy resin in grams that contain one equivalent weight of epoxy, wherein the equivalent weight of epoxy is the molecular weight of the epoxy resin divided by an average number of epoxy groups in the epoxy resin.

In an example implementation (or aspect) combinable with any other example implementation (or aspect), the curing agent has an amine value in a range of from about 250 milligrams of potassium hydroxide per gram (mg KOH/g) to about 1,700 mg KOH/g, wherein the amine value is a weight of potassium hydroxide in milligrams needed to neutralize one gram of the curing agent.

In an example implementation (or aspect) combinable with any other example implementation (or aspect), the curing agent has an amine hydrogen equivalent weight (AHEW) in a range of from about 20 grams (g) to about 120 g, wherein the AHEW is the molecular weight of the curing agent divided by a number of active hydrogens per molecule of the curing agent.

In an example implementation (or aspect) combinable with any other example implementation (or aspect), the composition is substantially free of water.

In an example implementation (or aspect), a system comprises: a wellbore formed in a subterranean formation; a tubular disposed within the wellbore; a cementing composition comprising: red mud; an epoxy resin; and a curing agent comprising nitrogen; and a pump configured to flow the cementing composition into an annulus between the tubular and a wall of the wellbore, wherein the curing agent is configured to crosslink the epoxy resin to solidify the cementing composition in response to exposure to a downhole condition of the wellbore, thereby cementing the tubular within the wellbore.

In an example implementation (or aspect) combinable with any other example implementation (or aspect), a concentration of the red mud in the cementing composition is in a range of from about 0.1 weight percent (wt. %) to about 50 wt. %.

In an example implementation (or aspect) combinable with any other example implementation (or aspect), a concentration of the epoxy resin in the cementing composition is in a range of from about 20 wt. % to about 99 wt. %.

In an example implementation (or aspect) combinable with any other example implementation (or aspect), a concentration of the curing agent in the cementing composition is in a range of from about 0.1 wt. % to about 20 wt. %.

In an example implementation (or aspect) combinable with any other example implementation (or aspect), the epoxy resin has an epoxy value in a range of from 4.5 epoxy equivalents per kilogram of the epoxy resin to 5.5 epoxy equivalents per kilogram of the epoxy resin, wherein the epoxy equivalent is the weight of the epoxy resin in grams that contain one equivalent weight of epoxy, wherein the equivalent weight of epoxy is the molecular weight of the epoxy resin divided by an average number of epoxy groups in the epoxy resin.

In an example implementation (or aspect) combinable with any other example implementation (or aspect), the curing agent has an amine value in a range of from about 250 milligrams of potassium hydroxide per gram (mg KOH/g) to about 1,700 mg KOH/g, wherein the amine value is a weight of potassium hydroxide in milligrams needed to neutralize one gram of the curing agent.

In an example implementation (or aspect) combinable with any other example implementation (or aspect), the curing agent has an amine hydrogen equivalent weight (AHEW) in a range of from about 20 grams (g) to about 120 g, wherein the AHEW is the molecular weight of the curing agent divided by a number of active hydrogens per molecule of the curing agent. While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
flowing a cementing composition into an annulus between a tubular disposed within a wellbore formed in a subterranean formation and a wall of the wellbore, wherein the cementing composition comprises: red mud; an epoxy resin selected from the group consisting of 2,3-epoxypropyl-o-tolyl ether, C12-C14 alkyl glycidyl ether, or 1,6-hexanediol diglycidyl ether; and a curing agent selected from the group consisting of trimethyl hexamethylene diamine (TMD), diethylenetriamine (DETA), triethylenetetramine (TETA), meta-xylenediamine (MXDA), tetraethylenepentamine (TEPA), polyetheramine, isophoronediamine (IPDA), or beta-hydroxyalkyl amide (HAA); and
crosslinking, by the curing agent, the epoxy resin to solidify the cementing composition in response to exposure to a downhole condition of the wellbore, thereby cementing the tubular within the wellbore.

2. The method of claim 1, wherein:
a concentration of the red mud in the cementing composition is in a range of from about 8 weight percent (wt. %) to about 14 wt. %;
a concentration of the epoxy resin in the cementing composition is in a range of from about 80 wt. % to about 95 wt. %; and
a concentration of the curing agent in the cementing composition is in a range of from about 2.0 wt. % to about 4.0 wt. %.

3. The method of claim 1, wherein the epoxy resin has an epoxy value in a range of from 4.5 epoxy equivalents per kilogram of the epoxy resin to 5.5 epoxy equivalents per kilogram of the epoxy resin, wherein the epoxy equivalent is the weight of the epoxy resin in grams that contain one equivalent weight of epoxy, wherein the equivalent weight of epoxy is the molecular weight of the epoxy resin divided by an average number of epoxy groups in the epoxy resin.

4. The method of claim 1, wherein the curing agent has an amine value in a range of from about 250 milligrams of potassium hydroxide per gram (mg KOH/g) to about 1,700 mg KOH/g, wherein the amine value is a weight of potassium hydroxide in milligrams needed to neutralize one gram of the curing agent.

5. The method of claim 1, wherein the curing agent has an amine hydrogen equivalent weight (AHEW) in a range of from about 20 grams (g) to about 120 g, wherein the AHEW is the molecular weight of the curing agent divided by a number of active hydrogens per molecule of the curing agent.

6. The method of claim 1, wherein the cementing composition is maintained within the annulus for a curing time in a range of from about 4 hours to about 12 hours, such that the curing agent crosslinks the epoxy resin.

7. A composition for cementing a wellbore, the composition comprising:
red mud;
an epoxy resin selected from the group consisting of 2,3-epoxypropyl-o-tolyl ether, C12-C14 alkyl glycidyl ether, or 1,6-hexanediol diglycidyl ether; and
a curing agent configured to crosslink the epoxy resin to solidify the composition in response to exposure to a downhole condition of the wellbore, thereby cementing the wellbore, wherein the curing agent is selected from the group consisting of trimethyl hexamethylene diamine (TMD), diethylenetriamine (DETA), triethylenetetramine (TETA), meta-xylenediamine (MXDA), tetraethylenepentamine (TEPA), polyetheramine, isophoronediamine (IPDA), or beta-hydroxyalkyl amide (HAA).

8. The composition of claim 7, wherein a concentration of the red mud in the composition is in a range of from about 8 weight percent (wt. %) to about 14 wt. %.

9. The composition of claim 8, wherein a concentration of the epoxy resin in the composition is in a range of from about 80 wt. % to about 95 wt. %.

10. The composition of claim 9, wherein a concentration of the curing agent in the composition is in a range of from about 2.0 wt. % to about 4.0 wt. %.

11. The composition of claim 7, wherein the epoxy resin has an epoxy value in a range of from 4.5 epoxy equivalents per kilogram of the epoxy resin to 5.5 epoxy equivalents per kilogram of the epoxy resin, wherein the epoxy equivalent is the weight of the epoxy resin in grams that contain one equivalent weight of epoxy, wherein the equivalent weight of epoxy is the molecular weight of the epoxy resin divided by an average number of epoxy groups in the epoxy resin.

12. The composition of claim 7, wherein the curing agent has an amine value in a range of from about 250 milligrams of potassium hydroxide per gram (mg KOH/g) to about 1,700 mg KOH/g, wherein the amine value is a weight of potassium hydroxide in milligrams needed to neutralize one gram of the curing agent.

13. The composition of claim 7, wherein the curing agent has an amine hydrogen equivalent weight (AHEW) in a range of from about 20 grams (g) to about 120 g, wherein the AHEW is the molecular weight of the curing agent divided by a number of active hydrogens per molecule of the curing agent.

14. The composition of claim 7, wherein the composition is substantially free of water.

15. A system comprising:

a wellbore formed in a subterranean formation;

a tubular disposed within the wellbore;

a cementing composition comprising:

red mud;

an epoxy resin selected from the group consisting of 2,3-epoxypropyl-o-tolyl ether, C12-C14 alkyl glycidyl ether, or 1,6-hexanediol diglycidyl ether; and a curing agent selected from the group consisting of trimethyl hexamethylene diamine (TMD), diethylenetriamine (DETA), triethylenetetramine (TETA), meta-xylenediamine (MXDA), tetraethylenepentamine (TEPA), polyetheramine, isophoronediamine (IPDA), or beta-hydroxyalkyl amide (HAA); and a pump configured to flow the cementing composition into an annulus between the tubular and a wall of the wellbore, wherein the curing agent is configured to crosslink the epoxy resin to solidify the cementing composition in response to exposure to a downhole condition of the wellbore, thereby cementing the tubular within the wellbore.

16. The system of claim 15, wherein:

a concentration of the red mud in the cementing composition is in a range of from about 8 weight percent (wt. %) to about 14 wt. %;

a concentration of the epoxy resin in the cementing composition is in a range of from about 80 wt. % to about 95 wt. %; and a concentration of the curing agent in the cementing composition is in a range of from about 2.0 wt. % to about 4.0 wt. %.

17. The system of claim 15, wherein the epoxy resin has an epoxy value in a range of from 4.5 epoxy equivalents per kilogram of the epoxy resin to 5.5 epoxy equivalents per kilogram of the epoxy resin, wherein the epoxy equivalent is the weight of the epoxy resin in grams that contain one equivalent weight of epoxy, wherein the equivalent weight of epoxy is the molecular weight of the epoxy resin divided by an average number of epoxy groups in the epoxy resin.

18. The system of claim 15, wherein the curing agent has an amine value in a range of from about 250 milligrams of potassium hydroxide per gram (mg KOH/g) to about 1,700 mg KOH/g, wherein the amine value is a weight of potassium hydroxide in milligrams needed to neutralize one gram of the curing agent.

19. The system of claim 15, wherein the curing agent has an amine hydrogen equivalent weight (AHEW) in a range of from about 20 grams (g) to about 120 g, wherein the AHEW is the molecular weight of the curing agent divided by a number of active hydrogens per molecule of the curing agent.

* * * * *